(12) United States Patent
Golander et al.

(10) Patent No.: US 9,851,919 B2
(45) Date of Patent: Dec. 26, 2017

(54) METHOD FOR DATA PLACEMENT IN A MEMORY BASED FILE SYSTEM

(71) Applicant: NETAPP, INC., Sunnyvale, CA (US)

(72) Inventors: Amit Golander, Tel-Aviv (IL); Boaz Harrosh, Tel-Aviv (IL)

(73) Assignee: NETAPP, INC., Sunnyvale, CA (US)

( * ) Notice: Subject to any disclaimer, the term of this patent is extended or adjusted under 35 U.S.C. 154(b) by 199 days.

(21) Appl. No.: 14/587,075

(22) Filed: Dec. 31, 2014

(65) Prior Publication Data
US 2016/0188217 A1    Jun. 30, 2016

(51) Int. Cl.
G06F 12/00  (2006.01)
G06F 3/06   (2006.01)

(52) U.S. Cl.
CPC .............. G06F 3/065 (2013.01); G06F 3/061 (2013.01); G06F 3/0685 (2013.01)

(58) Field of Classification Search
CPC ....... G06F 3/065; G06F 3/0604; G06F 3/0683
See application file for complete search history.

(56) References Cited

U.S. PATENT DOCUMENTS

| | | | | |
|---|---|---|---|---|
| 6,154,813 A | * | 11/2000 | Martin .................. | G06F 12/121 709/203 |
| 6,490,671 B1 | * | 12/2002 | Frank .................. | G06F 12/1027 711/202 |
| 7,702,698 B1 | | 4/2010 | Chakravarthy | |
| 8,402,226 B1 | * | 3/2013 | Faibish ............... | G06F 12/0804 710/52 |
| 8,549,230 B1 | * | 10/2013 | Chatterjee ............. | G06F 3/0608 711/113 |
| 8,843,459 B1 | | 9/2014 | Aston | |
| 9,274,941 B1 | | 3/2016 | Throop | |
| 2002/0083299 A1 | * | 6/2002 | Van Huben ....... | G06F 15/17381 712/29 |
| 2005/0071599 A1 | * | 3/2005 | Modha .................. | G06F 9/5016 711/170 |
| 2005/0235114 A1 | | 10/2005 | Megiddo | |
| 2006/0010169 A1 | | 1/2006 | Kitamura | |
| 2006/0026372 A1 | * | 2/2006 | Kim ........................ | G06F 12/08 711/160 |
| 2006/0195485 A1 | | 8/2006 | Bird | |

(Continued)

OTHER PUBLICATIONS

Joel Coburn, Adrian M. Caulfield, Ameen Akel, Laura M. Grupp, Rajesh K. Gupta, Ranjit Jhala, Steven Swanson; NV-Heaps: Making Persistent Objects Fast and Safe with Next-Generation, Non-Volatile Memories; Newport Beach, California, USA—Mar. 5-11, 2011; ACM New York, NY, USA; ISBN: 978-1-4503-0266-1.*

*Primary Examiner* — Charles Rones
*Assistant Examiner* — Nanci Wong
(74) *Attorney, Agent, or Firm* — Klein, O'Neill & Singh, LLP (57) ABSTRACT

Methods for data placement in a memory-based file system are described, including copying a user data unit from a second storage type device to a first storage type device based on an access request to the file system, the first storage type device being a faster access device than the second storage type device, referencing the user data unit in the first storage type device by a byte addressable memory pointer, and using the byte addressable memory pointer to copy the user data unit from the first storage type device to the second storage type device based on data access pattern.

20 Claims, 9 Drawing Sheets

(56) References Cited

U.S. PATENT DOCUMENTS

| | | |
|---|---|---|
| 2009/0089781 A1 | 4/2009 | Shingai |
| 2009/0265403 A1 | 10/2009 | Fukumoto |
| 2010/0281230 A1 | 11/2010 | Rabii |
| 2010/0312955 A1* | 12/2010 | Hwang ................ G06F 12/121 711/105 |
| 2011/0010504 A1 | 1/2011 | Wang |
| 2012/0023233 A1 | 1/2012 | Okamoto |
| 2012/0059978 A1 | 3/2012 | Rosenband |
| 2012/0143919 A1* | 6/2012 | Idicula ................ G06F 17/2247 707/796 |
| 2012/0198121 A1 | 8/2012 | Bell, Jr. |
| 2012/0254520 A1* | 10/2012 | Roh ................... G06F 12/0638 711/103 |
| 2013/0080703 A1 | 3/2013 | Kumagai |
| 2013/0138867 A1 | 5/2013 | Craft |
| 2013/0268728 A1* | 10/2013 | Ramanujan ........ G11C 14/0045 711/105 |
| 2014/0258672 A1* | 9/2014 | Herron ................ G06F 12/0223 711/171 |
| 2014/0281306 A1 | 9/2014 | Nakajima |
| 2014/0304451 A1 | 10/2014 | Shibayama |
| 2015/0032943 A1* | 1/2015 | Asnaashari ........... G06F 3/0688 711/103 |
| 2015/0212897 A1* | 7/2015 | Kottomtharayil ... G06F 11/1448 714/20 |
| 2015/0286436 A1* | 10/2015 | Olson .................. G06F 3/0619 711/162 |

* cited by examiner

METHOD FOR DATA PLACEMENT IN A MEMORY BASED FILE SYSTEM

FIELD OF THE INVENTION

This invention relates to the field of data placement in tiered systems and in particular to data placement in a memory based file system.

BACKGROUND

Automated tiering and caching are known solutions to data storage system performance problems. Storage systems typically include different speed storage type devices, also named tiers. A fast tier (e.g., consisting of a flash based solid-state drive (SSD)) will typically have a lower latency in accessing data than a slower tier (e.g., consisting of a hard disk drive (HDD)). The storage systems, using storage software, automatically make data placement decisions to the different tiers based on data access patterns.

Caching is an acceleration mechanism typically using volatile memory or SSD in front of the storage device or system. Basic forms of caching include "read-only" caching, which operates on data that resides in the slower storage device or system and is copied into cache after a certain threshold of read activity occurs; and "write-through" caching, which writes data to both the cache and the storage device or system at the same time. In both cache methods write operations are committed at the slower storage speed. "Write-back" caching is a method in which write requests are directed to cache and completion is immediately confirmed to the requestor. This results in low latency and relatively high throughput however there is data availability exposure risk because the only copy of the written data is in cache.

Tiering typically writes data in its entirety, first to one storage type, and then moves that data to different storage types based on a data access pattern.

Tiering typically moves data between tiers (instead of copying it), both from slower storage to the faster storage and vice versa, whereas when the cache is done with the data it was accelerating, it typically nullifies it instead of copying it back to the storage area.

Flash technology, unlike HDD technology, wears out with every write, increasing the risk for SSD failure. An enterprise-grade flash-based SSD is only guaranteed to work for a limited number of write operations (e.g. 1000 full drive writes). This issue may be dealt with by using expensive over-provisioned SSD drives and/or replacing SSDs often. Thus, high maintenance costs and/or an increased risk of SSD failure are a concern with both tiering and caching technologies.

Newly emerging non-volatile or persistent memory (PM) technology may be implemented through a nonvolatile media attached to the central processing unit (CPU) of the computer. PM is characterized by low RAM-like latencies, so it is 1,000 to 100,000 faster per access than the flash-based SSD and HDD memories respectively.

PM is implemented today using backed-up dynamic random access memory (DRAM) or magneto-resistive random-access memory (MRAM) or spin-transfer torque magnetic random-access memory (STT-MRAM) technologies. Other emerging technologies, such as resistive random-access memory (ReRAM and phase-change memory (PCM) which are very dense, may enable cheaper, though slower, PM components.

File systems are usually block-based and tuned to HDD and/or SSD medias, and as such, they do not store or cache user data on memory resource. Typically, a separate software layer manages memory-based software caching. One such common example, is the Linux virtual file system (VFS) page cache, which caches user data in a volatile manner, so that read requests that can be served from the page cache may not even reach the underlying file system.

Some file systems (for example, ZFS, a combined file system and logical volume manager designed by Sun Microsystems) support tiering technology, whereas some file systems run on top of a multi tiering block service (for example, IBM EasyTier™).

Some file systems (for example, NetApp WAFL™) uses non-volatile RAM (NVRAM) but not as a tier for user data, but rather the NVRAM is used as a persistent write cache for meta data or as a temporary staging area being cleared for example every 10 seconds via a checkpoint mechanism.

Emerging PM-aware file systems (e.g. EXT4-DAX) directly access the PM, avoiding the slow and cumbersome caching and/or memory map services of the VFS layer. However, none of these systems support tiering, as they all assume that the entire data set resides in a homogenous PM space.

Thus, no multi-tiering file system uses a non-volatile memory tier directly (e.g., via a memory pointer).

SUMMARY

Embodiments of the present invention enable using a non-volatile memory device as a first tier for file system user data in a data storage system, thereby improving performance and reducing the risks involved in the use of SSD.

A method for data placement in a memory-based file system, according to one embodiment of the invention, includes copying a user data unit from a second storage type device to a first storage type device based on an access request to the file system, the first storage type device being a faster access device than the second storage type device; referencing the user data unit in the first storage type device by a byte addressable memory pointer; and using the byte addressable memory pointer to copy the user data unit from the first storage type device to the second storage type device based on data access pattern, for example, a repeated access pattern.

In response to an access request the user data unit from the first storage type device is provided and not the user data unit from the second storage type device, thus, ensuring that the most updated copy is provided per access request.

In one embodiment the first storage type device includes a non-volatile memory and the method includes maintaining the non-volatile memory into a list of pages and managing the list based on a repeated data access pattern. In some embodiments the non-volatile memory may be maintained into a plurality of lists each list to receive an unclassified page at the head of the list. The unclassified page is assigned to a list from the plurality of lists by applying a function on an address of the unclassified page, for example, a modulo-based function.

In some embodiments the non-volatile memory may be maintained into a first list of pages and a second list of pages, the first list to receive an unclassified page at the head of the first list and the second list to receive, at the head of the second list, a page moved from the tail of the first list. Pages may be moved from the second list to the head of the first list based on a repeated access pattern.

In one embodiment the method includes asserting a dirty flag associated with a page at the tail of the first list; and based on the assertion of the dirty flag, copying a user data unit associated with the page from the first storage type device to the second storage type device while the page is in the second list.

In one embodiment the method includes determining that the user data unit was fully copied to the second storage type device; and nullifying the user data unit from the first storage type device, thereby providing a clean page. A clean page may be moved to the tail of the second list and may be stored there.

In some embodiments an access request to the file system comprises an mmap system call which provides a page having a transparent flag. A method according to embodiments of the invention may include providing protection against direct access to the page having the transparent flag prior to the page being received at the head of the second list.

In one embodiment there is provided a method for data placement in a memory-based file system, which includes maintaining a copy of a user data unit in a first storage type device (which includes a non-volatile memory), based on data access pattern (e.g., based on a repeated access pattern), and maintaining a copy of the user data unit in a second storage type device. The first storage type device is typically a faster access device than the second storage type device.

The method further includes accepting access requests to the file system while the user data unit is maintained in the first storage type device. If the access requests comprise exclusively read access requests, then, based on the data access pattern, the user data unit from the first storage type device is nullified. If at least one access request comprises a write access request, then, based on the data access pattern, the user data unit is copied from the first storage type device to the second storage type device.

In this embodiment a user data unit is only copied back to the second storage type device if it has been modified thereby greatly reducing the number of write operations to the second storage type device and reducing the associated device wear-out.

In one embodiment there is provided a method for recycling a page in a file system. The method may include maintaining a memory of a first storage device into a first list of pages and a second list of pages. At the tail of the first list, asserting a dirty flag associated with a page thereby determining that the page is a dirty page; moving the dirty page from the tail of the first list to the head of the second list; copying the dirty page from the first storage device to a second storage device; and cleaning the dirty page in the second list thereby making the page available for recycling. The cleaned page may be stored at the tail of the second list.

A dirty page, which includes user data may be cleaned by nullifying the user data.

In one embodiment the method may include maintaining the memory of the first storage device into a plurality of first lists and second lists; and assigning a page to a first list from the plurality of first lists by applying a function (e.g., a modulo-based function) on an address of the page.

In one embodiment the first storage device is a lower latency storage device than the second storage device.

In one embodiment the memory is a non-volatile memory device configured to be referenced by a byte addressable memory pointer.

BRIEF DESCRIPTION OF THE FIGURES

The invention will now be described in relation to certain examples and embodiments with reference to the following illustrative figures so that it may be more fully understood. In the drawings.

DETAILED DESCRIPTION

In typical data storage systems data may be stored in different types of storage devices based on access or predicted access patterns. For example, an access pattern may refer to the frequency of access in recent times and a prediction can be made based on past access patterns e.g., how recently and/or how frequently data has been accessed in the past hours or days.

Known storage systems may include two or more tiers; a first tier including a fast access (low latency) and typically more expensive storage type device (such as SDD) and a second tier including a slower access (high latency) and typically cheaper storage device (such as HDD). This architecture enables a cost-efficient data storing solution however its efficiency may depend on the efficiency of the method used by the system for data placement.

Embodiments of the invention relate to a system and method for placement of user data in a storage system which enables using improved persistent memory devices in a first tier and which can deliver high speed and low latency memory with almost unlimited read/write activity.

In a storage system data is usually managed in units. A data unit may include user data (e.g., the actual information that the file system user asked to save) and/or file system meta data. Units which include user data may be referred to, in the present invention, as "user data units". The term "page" may be used, in the present invention, to describe a data unit which may include user data and/or meta data.

An exemplary system and exemplary methods according to embodiments of the invention will be described below. Different embodiments are disclosed herein. Features of certain embodiments may be combined with features of other embodiments; thus certain embodiments may be combinations of features of multiple embodiments.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
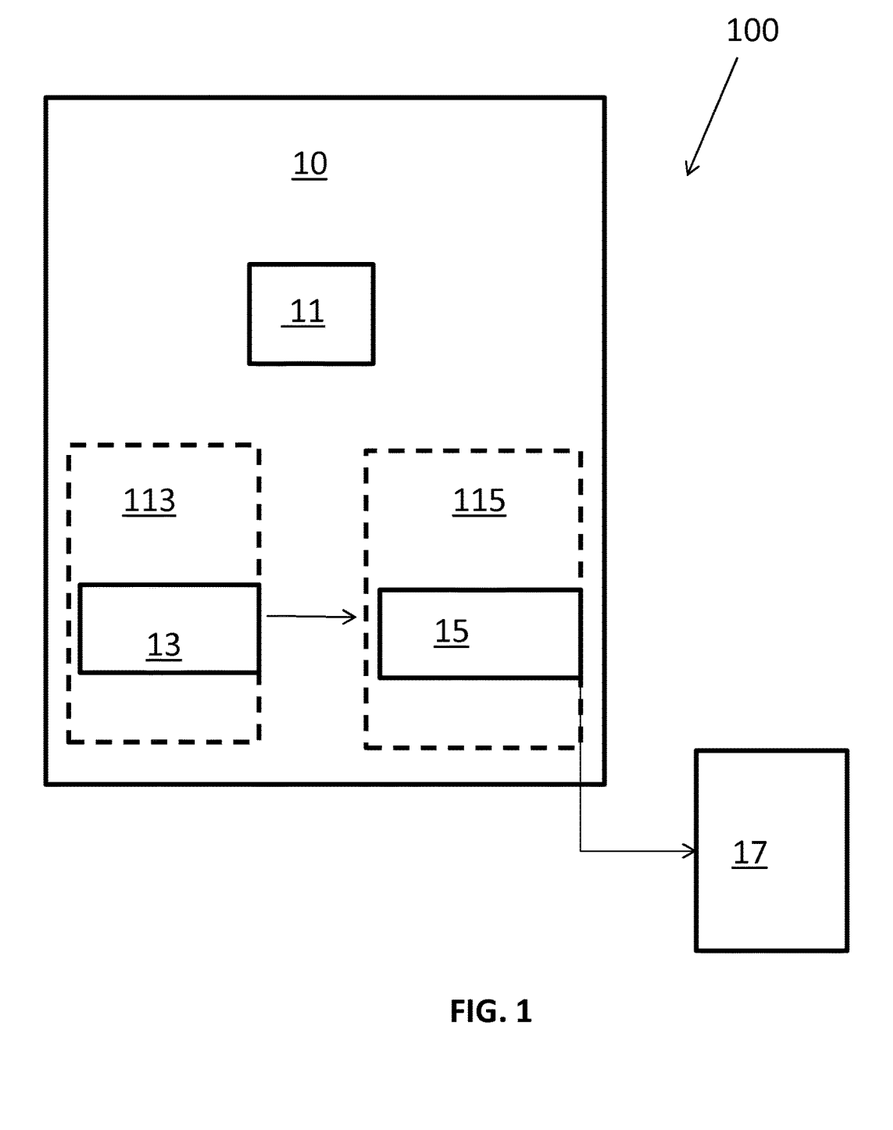
FIG. 1 and FIG. 2 schematically illustrate an exemplary system according to embodiments of the invention.
Figure 2:
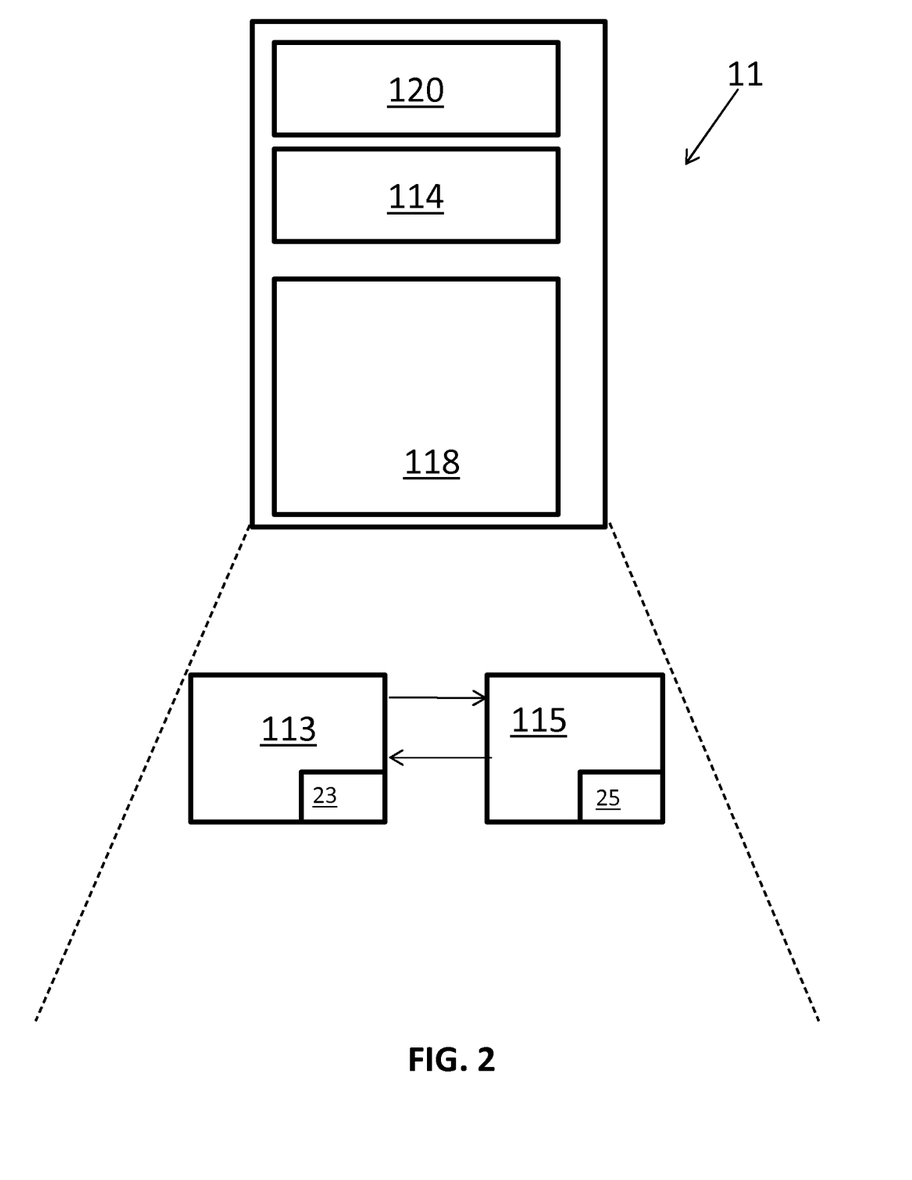

FIGS. 1 and 2 schematically illustrate an exemplary system according to embodiments of the invention.

FIG. 1 shows an exemplary high-level architecture of a computer data storage system 100, which includes a memory aware or memory based file system according to embodiments of the invention.

According to one embodiment the system 100 includes an apparatus such as a node 10 (e.g., a server) having at least one central processing unit (CPU) core 11 and which includes a plurality of storage type devices. Each storage type device or devices may make up a tier. The embodiment illustrated in FIG. 1 shows three storage types however a system according to embodiments of the invention may include more or less than three storage type devices.

In one embodiment a first tier 113 is a fast access tier which may include one or more storage devices of the same type. In one embodiment tier 113 includes one or more non-volatile memory device(s) 13 (e.g., non-volatile dual in-line memory module (NVDIMM), or non-volatile memory card or brick over PCIe or Infiniband or another, possibly proprietary ultra-low latency interconnect), which may also be referred to as fast persistent memory (PM)). A second tier 115 is a slower access tier which may include one or more storage devices of a different type than the storage devices in tier 113. In one embodiment tier 115 includes a storage device 15 (e.g., Flash-based SSD or a slow PM). A third, even slower tier may include an over the network service system 17 (such as FC, FCoE, ISCSI, NFS, SMB, S3, Swift and other RESTful object services).

A fast access storage type device (e.g., non-volatile memory device 13) may be, for example, 1,000 faster per access than the slower access storage type device (e.g., device 15).

System 100 may include additional memories and storage devices, a network interface card (NIC) and possibly other peripherals (e.g., cards and/or chips) (not shown).

According to embodiments of the invention, a user data unit is maintained in a first storage type device, such as in non-volatile memory 13. Descriptors (e.g., pointers) of the user data unit may be maintained in tier 113 in non-volatile memory 13 or in another memory included in tier 113 and/or may be maintained in another storage type device of the system, e.g., a volatile memory device.

In one embodiment the CPU 11 references the user data unit in a first storage type device (e.g., non-volatile memory device 13) by a byte addressable memory pointer and copies the user data unit to a second storage type device (e.g., device 15) using the byte addressable memory pointer and based on data access pattern. A user data unit may be maintained (possibly indefinitely) in the first storage type device based on, for example, a repeated access pattern. If/when the access pattern does not include repeated access the data unit may "age", which means that it is removed from the first storage device, e.g., copied to the second storage device. Access typically includes access requests such as I/O requests to the user data unit.

In some embodiments the CPU 11 references the user data unit in the second storage type device by a block offset.

In an exemplary architecture schematically illustrated in FIG. 2 CPU 11 runs one or more applications 120 that use a file system 118 to store and retrieve data, typically through a standard interface 114, such as POSIX. File system 118, which may be stored in one or more storage devices (e.g., in non-volatile memory 13 and/or in storage device 15 and/or in other memories or storage devices), may use the components described in system 100 to store user data and meta data.

As described above, a user data unit may be copied from a first storage device type (e.g., non-volatile memory 13) to a second storage device type (e.g., to storage device 15 and/or to remote service system 17) based on an access pattern. Thus, a first copy 23 of the user data unit is stored in a fast access tier, e.g., in non-volatile memory 13 and a second copy 25 of the user data unit is stored in a slower access tier e.g., in storage device 15 and/or in remote service system 17. A user data unit may be copied from the slower access tier (e.g., from storage device 15) to a faster tier, (e.g., to non-volatile memory 13) based on an I/O request to the file system 118.

Once the first copy 23 of the user data unit has aged and has been copied (to copy 25) copy 23 may be nullified, leaving a copy of the user data unit in the slower access tier. Copy 25 may be copied into the fast tier once it is accessed again.

Meta data related to or associated with the user data may be stored in non-volatile memory 13 and in storage device 15 and/or in remote service system 17 or in other memories or storages.

According to one embodiment the CPU 11 may execute methods according to embodiments of the invention by referencing a user data unit in the first storage type device (e.g. non-volatile memory 13), by a byte addressable memory pointer and copying the user data unit to a second storage type device (e.g. device 15) using the byte addressable memory pointer and based on data access patterns.

In one embodiment user data access or I/O requests include a write request (which may include an indirect "write" using a write system call and/or a direct "write" using an mmap system call and machine level store instructions) which causes a dirty flag to be associated with the page related to this user data (the page may include the user data and/or meta data). In this embodiment, once a dirty flag associated with the page is asserted, the user data unit related to that page is copied from the first storage type device (in the fast tier 113) to the second storage type device (in the slower tier 115) and after the user data unit has been copied to the slower tier, the copy in the fast tier is nullified. However, if no dirty flag associated with the page is asserted then the user data unit associated with that page is not copied from the first storage type device (in the fast tier 113) to the second storage type device (in the slower tier 115), rather the user data from that page may be nullified and the page may be recycled.

In this embodiment a user data unit is only copied back to the slower tier if it's been modified thereby greatly reducing the number of write operations to the slower tier storage type device (e.g., SSD) and reducing the associated SSD wear-out. This may enable the use of cheaper lower-endurance Flash-based SSDs and/or reduces the associated maintenance effort of replacing worn-out SSDs.

In both cases, if there is an access request, the copy 23 of the user data unit from the first storage type device (e.g., non-volatile memory 13) is provided in response to the request and not the copy 25 of the user data unit from the second storage type device (e.g., device 15).

As discussed above, data may be managed in units. The units may be managed in lists. A list, in the context of the invention, refers to a data structure consisting of a group of nodes which together represent a sequence having a beginning (head) and end (tail). Basically, each node may contain a page (which may include user data or meta data) and includes a reference or link (e.g., a pointer or means to calculate a pointer) to the next node in the sequence. A list may include pages or descriptors (e.g., pointers) of pages whereas the pages themselves may be kept elsewhere. A list is typically stored in memory.

User data access may include I/O requests for a user data unit (e.g., a page). The requested user data unit or page may be a page previously accessed, or a new, unclassified page, e.g., from a pool of unclassified pages, or a page made unclassified through a recycling process. Typically, pages (either from the pool of unclassified pages or recycled pages) are input to the head of a list and are pushed along the sequence towards the tail of the list by new pages entering the head of the list. Some lists may be managed as first in first out (FIFO). Other lists may be managed in a least recently used manner (LRU), which is further explained below. Once the memory is full, or a certain capacity threshold is crossed, one or more pages must be moved out of the memory before a new page or pages can be moved in. The pages moved out of the memory are typically the pages at the tail of the list.

Once a page is requested it may be moved to the head of the list when it is found and is then pushed through the list as new pages are added to the head of the list. Thus a page may be moved out of the list back to the head of the list once the page is requested again. This scheme, termed "least recently used" (LRU), ensures that the most recently used pages are at the head of the list thus staying in the memory at least until they reach the tail of the list where, as they are the least recently requested/used pages, they are removed from the list. A page may "age" if it is not requested again, and may eventually be moved out of the list.

According to one embodiment the file system 118 maintains a memory into a list of pages and manages the list based on a repeated access pattern.

According to one embodiment the file system 118 maintains a memory into a plurality of lists each list to receive an unclassified page at the head of the list. Each unclassified page is assigned to a list from the plurality of lists by applying a function on an address of the unclassified page, as further described below.

In some embodiments the file system 118 maintains a memory into a first list of pages and a second list of pages, the first list to receive an unclassified page at the head of the first list and the second list to receive, at the head of the second list, a page moved from the tail of the first list.

In one embodiment lists can be implemented in one type of memory (e.g., volatile memory) but describe pages kept in another type of memory (e.g., non-volatile memory 13).

Several applications request the file system to map a portion of the stored data to memory (e.g. via a POSIX mmap system call) and then try to access it directly via machine level instructions. Traditional file systems typically leverage the VFS page cache, so that they copy the data from the file system to the page cache and let the VFS manage its volatile memory and serve the application.

In one embodiment of the invention file system 118 is a memory based or memory aware file system, i.e., which enables direct memory access by applications with memory-mapped I/O directly to the data it holds rather than to a cache.

Direct I/O using machine instruction code is typically unnoticed by software such as the file system 118 (which notices indirect read and write system calls). For direct I/O requests the file system 118 creates a new mapping in the virtual address space of the calling process that can now use the memory directly with machine instructions, such as load and store, and without going through the interface 114, e.g., POSIX system calls. Direct accesses to mmaped pages, after the first access, are "transparent" to the file system 118 (making a page become transparent). However, memory protection, typically used to prevent a process from accessing memory that has not been allocated to it, can be used according to embodiments of the invention, to gain file system visibility (make the page non-transparent) in order to enable accessing an otherwise transparent page.

Methods according to embodiments of the invention operate at the file system 118 level and are thus responsible for serving the initial direct I/O request and turning the requested pages to transparent (i.e. by adding the proper mapping to the process's page table). Providing visibility to transparent pages (also referred to as "protection") may be done for example by adding a transparent page flag to each page that becomes transparent due to an mmap request and/or a consecutive page fault, and for such marked transparent page—revoke the relevant entry from the process page table (and its hardware cache commonly called translation look-aside buffer (TLB)), meaning that a new page fault will be issued if the user process tries to access the page again, thereby protecting the page, namely, making it visible or non-transparent to the file system.

In some embodiments (which will be further described below), in which a memory is maintained into a first list and second list, a point of protection is provided for pages prior to being moved into the second list.

In one embodiment system 100 includes a software programming code or computer program product that is typically embedded within, or installed on a computer. Alternatively, components of system 100 can be stored in a suitable storage medium such as, a CD, a drive (e.g., HDD, SSD, DOM), memory stick, remote console or like devices.

Embodiments of the invention may include an article such as a computer or processor readable non-transitory storage medium, such as for example a memory, a drive, or a USB flash memory encoding, including or storing instructions, e.g., computer-executable instructions, which when executed by a processor or controller, cause the processor or controller to carry out methods disclosed herein.

Methods according to embodiments of the invention manage data placement in a file system. Methods for data placement in a file system, according to embodiments of the invention, are schematically illustrated in the following figures.

Figure 3A:
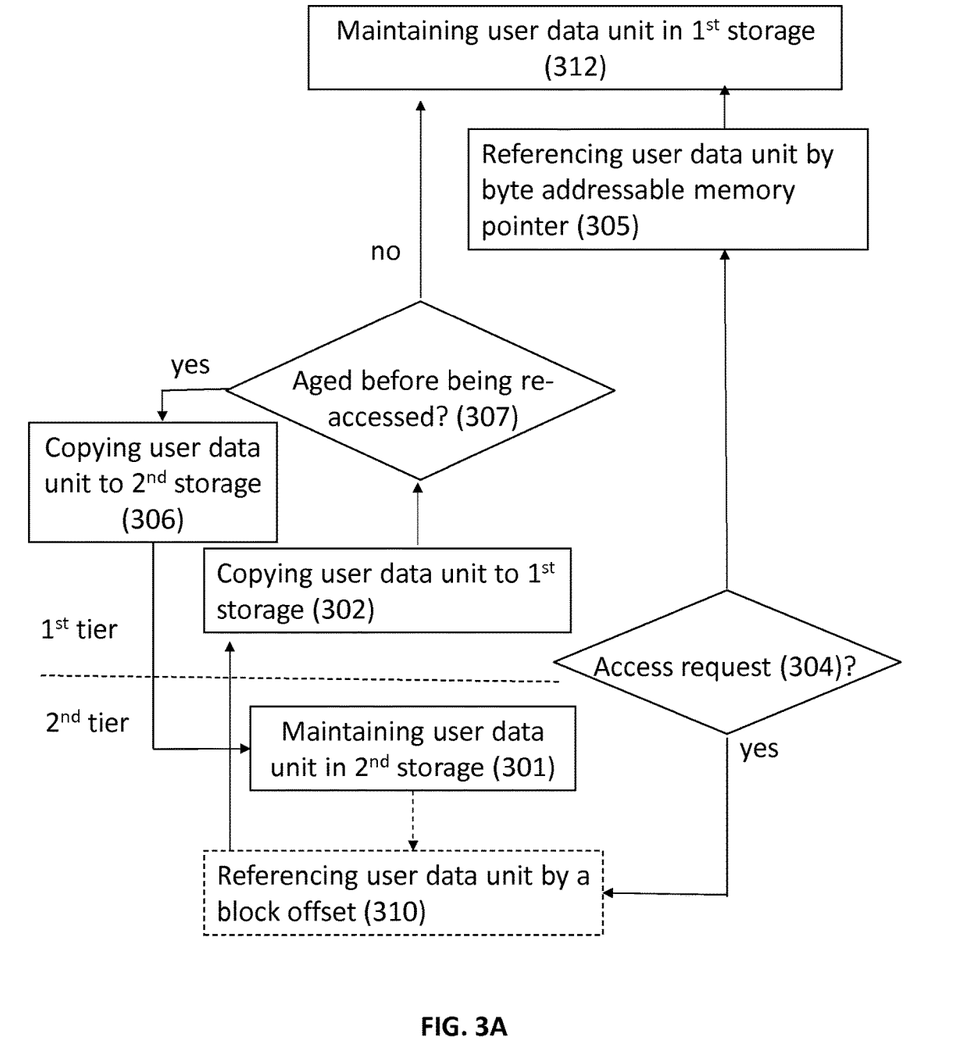
FIGS. 3A-3C schematically illustrate methods for data placement in a file system, according to embodiments of the invention.

In one embodiment, which is schematically illustrated in FIG. 3A, the method may include the steps of copying a user data unit (which is maintained in a second storage device (301)) from a second storage type device to a first storage type device (302) based on an access request to the file system (304). The first storage type device (e.g., non-volatile memory 13) is typically a faster access device than the second storage type device (e.g., device 15). The user data unit in the first storage type device is referenced by a byte addressable memory pointer (305) and using the byte addressable memory pointer the user data unit may be read from, written to and later also copied from the first storage type device to the second storage type device (306) based on data access pattern. For example, if the user data unit has aged before being re-accessed (307) then the user data unit may be copied to the second storage type device (306). If the user data unit is being repeatedly accessed while in the first storage type device then the user data unit is maintained in the first storage device (312), possibly indefinitely.

The first storage type device may include a non-volatile memory (such as NVDIMM or other fast PM) and the user data unit is typically stored on the non-volatile memory. In some embodiments the second storage type device includes a block addressable storage device (such as HDD or Flash-based SSD) and the user data unit in the second storage type device is referenced by a block offset (310) and is copied to the first storage type device (302) using the block offset. In other embodiments the second storage type device may be a byte addressable storage device (such as a slow PM) and the user data unit in the second storage type device is referenced by a byte addressable memory pointer.

This embodiment enables using a non-volatile memory device, such as a PM device, as a first tier for file system user data thereby improving the data storage system efficiency and reducing the risks involved in the use of SSD.

Figure 3B:
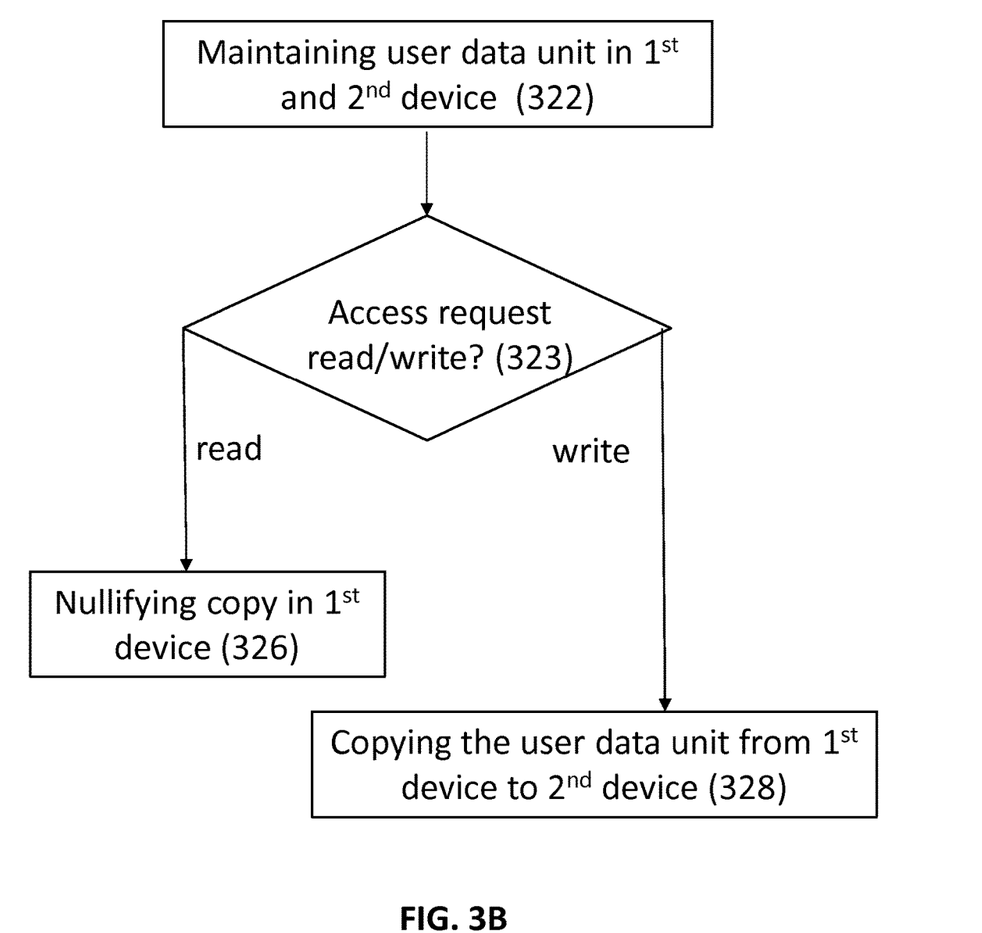

In one embodiment which is schematically illustrated in FIG. 3B, a copy of a user data unit is maintained in a first storage type device (which may include a non-volatile memory) while a copy of the user data unit is also maintained in a second storage type device (322). For example, a user data unit may be copied from the second storage device to the first storage device based on an access request, as described above. Also, as described above, the user data unit is maintained in the first storage type device based on data access pattern, for example, based on a repeated access pattern.

Following an access request that does not modify the data (e.g., a read access request to the file system (323)), the user data unit from the first storage type device is nullified (326) so that a copy of the unmodified user data is maintained only in the second storage type device. However, following an access request that modifies the data (e.g., a write access request to the file system (323)), the user data unit is copied from the first storage type device to the second storage type device (328), thereby leaving an updated copy of the modified user data in the second storage type device.

The first storage type device may be a faster access device than the second storage type device.

The above description relates to a very basic scheme. In actuality, there may be many access requests of the user data unit while it is maintained in the first storage type device. The access requests may be of different types (e.g., read or write). According to the embodiment described in FIG. 3B, the method includes accepting access requests to the file system while the user data unit is maintained in the first storage type device. If the access requests are exclusively read type access requests then, based on the data access pattern, the user data unit from the first storage type device is nullified (326). If at least one access request is a write type access request then, based on the data access pattern, the user data unit is copied from the first storage type device to the second storage type device (328).

In this embodiment a user data unit is only copied back to the second storage type device if it has been modified, thereby greatly reducing the number of write operations to the second storage type device and reducing the associated device wear-out.

Figure 3C:
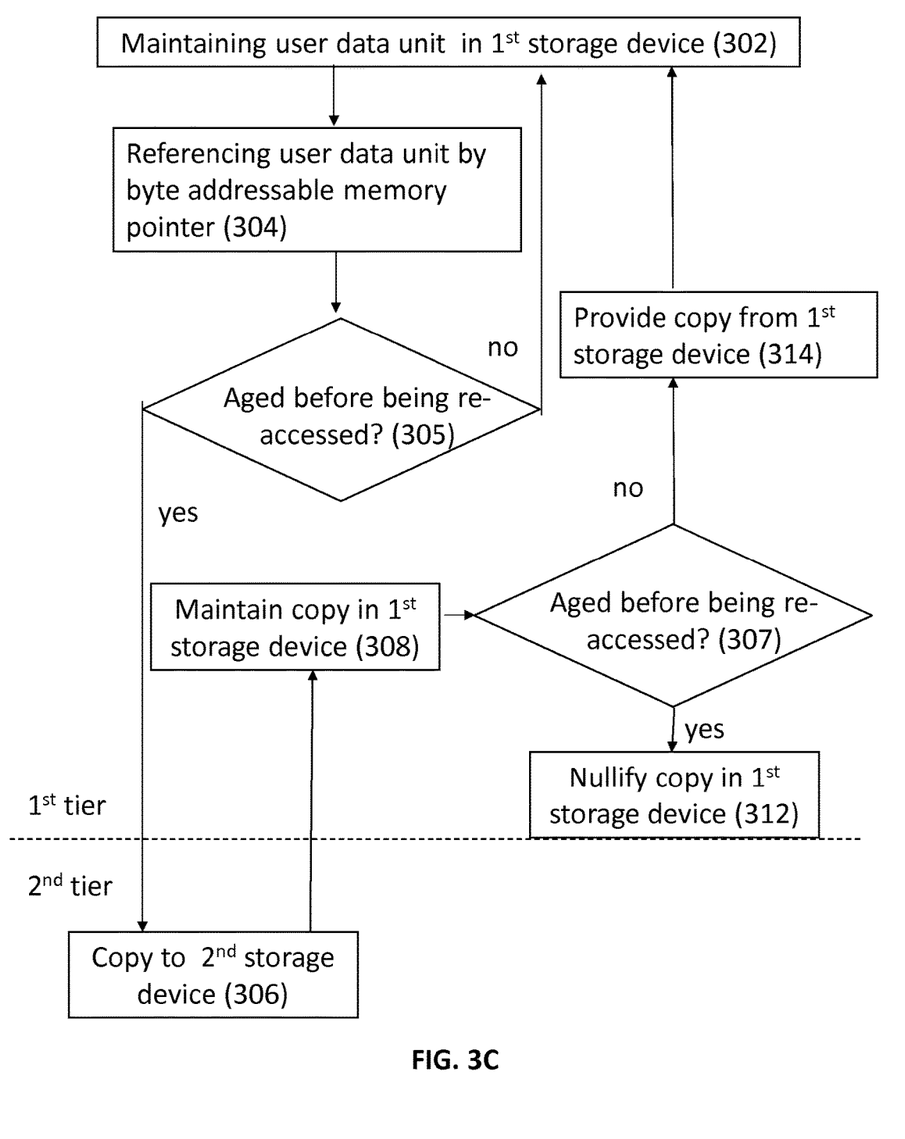

In one embodiment, which is schematically illustrated in FIG. 3C, a user data unit is maintained in a first storage type device (302) and is referenced by a byte addressable memory pointer (304). If the user data unit aged in the first storage type device before it has been re-accessed (305) then the user data unit is copied, typically using the byte addressable memory pointer, to the second storage type device (306). If not, the user data unit is maintained in the first storage type device.

As, described above, in some embodiments, when the copying of the user data unit to the second storage type device is complete a copy of the user data unit may still be maintained in the first storage type device (308). If the copy of the user data unit in the first storage type device ages before it is re-accessed (307) then the copy of the user data unit in the first storage type device is nullified (312), leaving a single copy of the user data unit in the second storage type device.

If the copy of the user data unit in the first storage type device has been re-accessed before it ages (307) then, in response to the user data access request, the copy of the user data unit from the first storage type device is provided (314) and the user data unit is maintained in the first storage type device (302).

The user data unit may be associated with a page and the page may be maintained in the first storage type device in a list. As described above, the aging of a user data unit in the first storage type device is dependent on the access pattern, for example, a repeated access for pages in a list.

Figure 4:
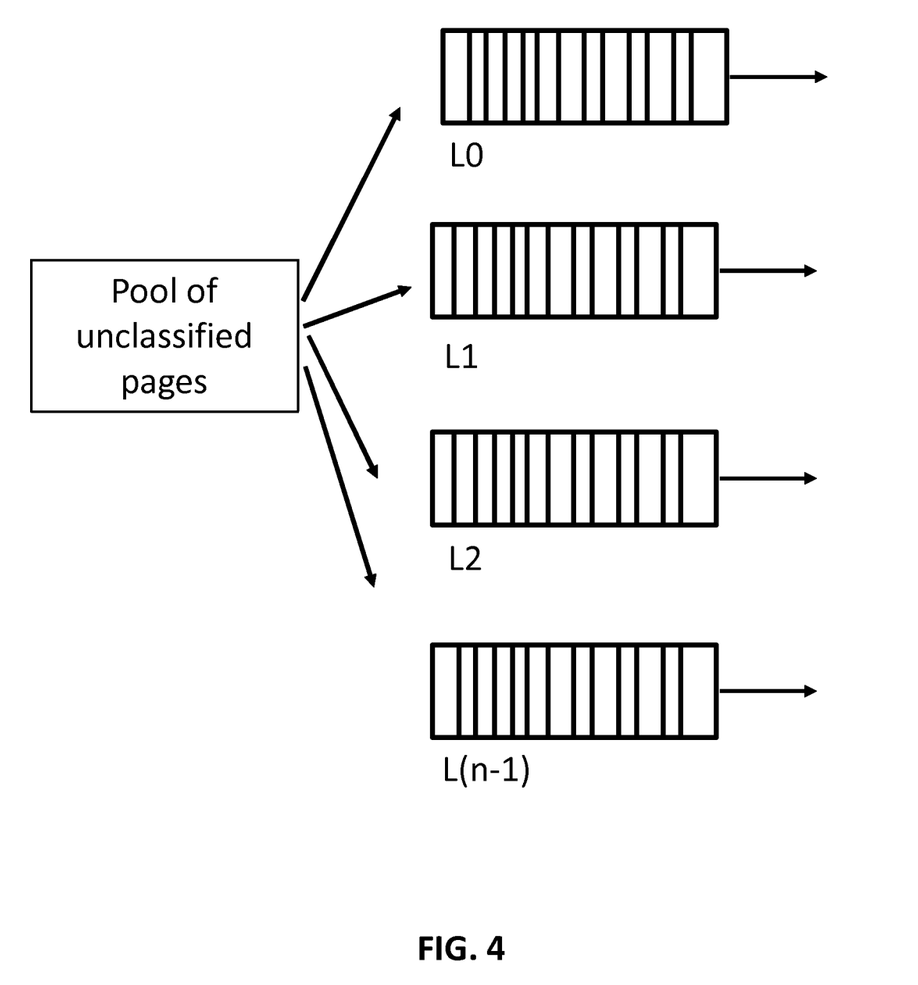
FIG. 4 schematically illustrates a method including maintaining a memory into a plurality of lists, according to an embodiment of the invention.

A method according to one embodiment of the invention includes maintaining a memory in a data storage system into a list of pages (e.g., as described above) and managing the list based on a repeated access pattern. In one embodiment, which is schematically illustrated in FIG. 4, (which describes a simplified scenario) the method (which may include the steps described in FIG. 3A-3C) includes maintaining the memory into a plurality of lists ($L_0, L_1, L_2 \ldots L_{n-1}$), each list to receive an unclassified page at the head of the list. Arrows show the direction of flow of the pages. The unclassified page may be assigned to a list from the plurality of lists by applying a function on the address of the unclassified page.

In one embodiment an unclassified page may be assigned to a list from the plurality of lists by applying a modulo function on the address of the unclassified page and the page is assigned to a list by choosing $L_i$, where i=modulo-based_junction (page address). This embodiment helps prevent collision of threads and lock contention by distributing pages among a plurality of lists.

Figure 5A:
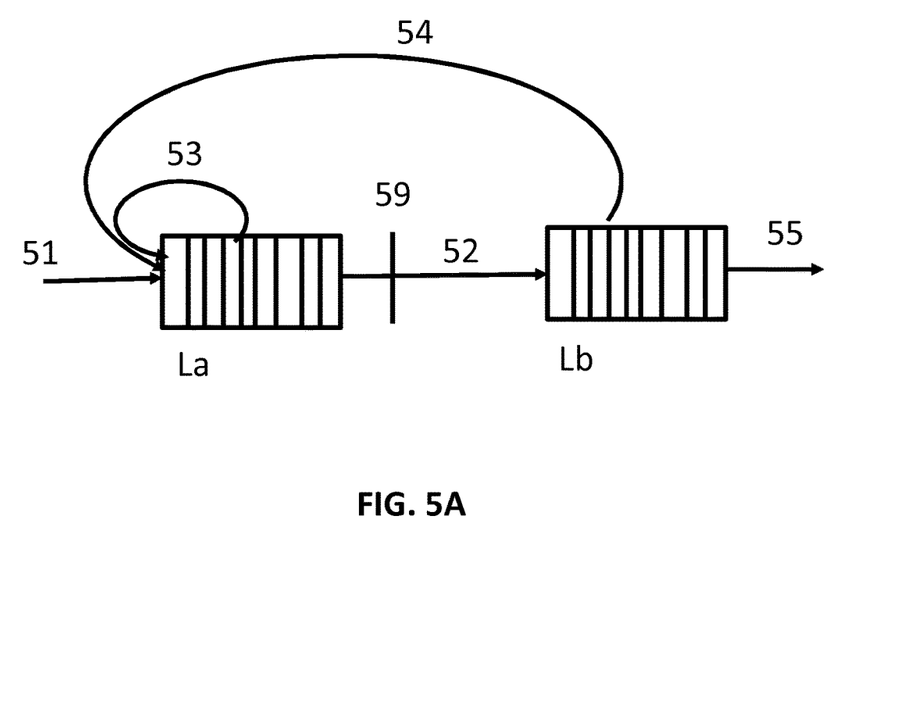
FIGS. 5A-5B schematically illustrate a method including maintaining a memory into a first list and a second list, according to embodiments of the invention.
Figure 5B:
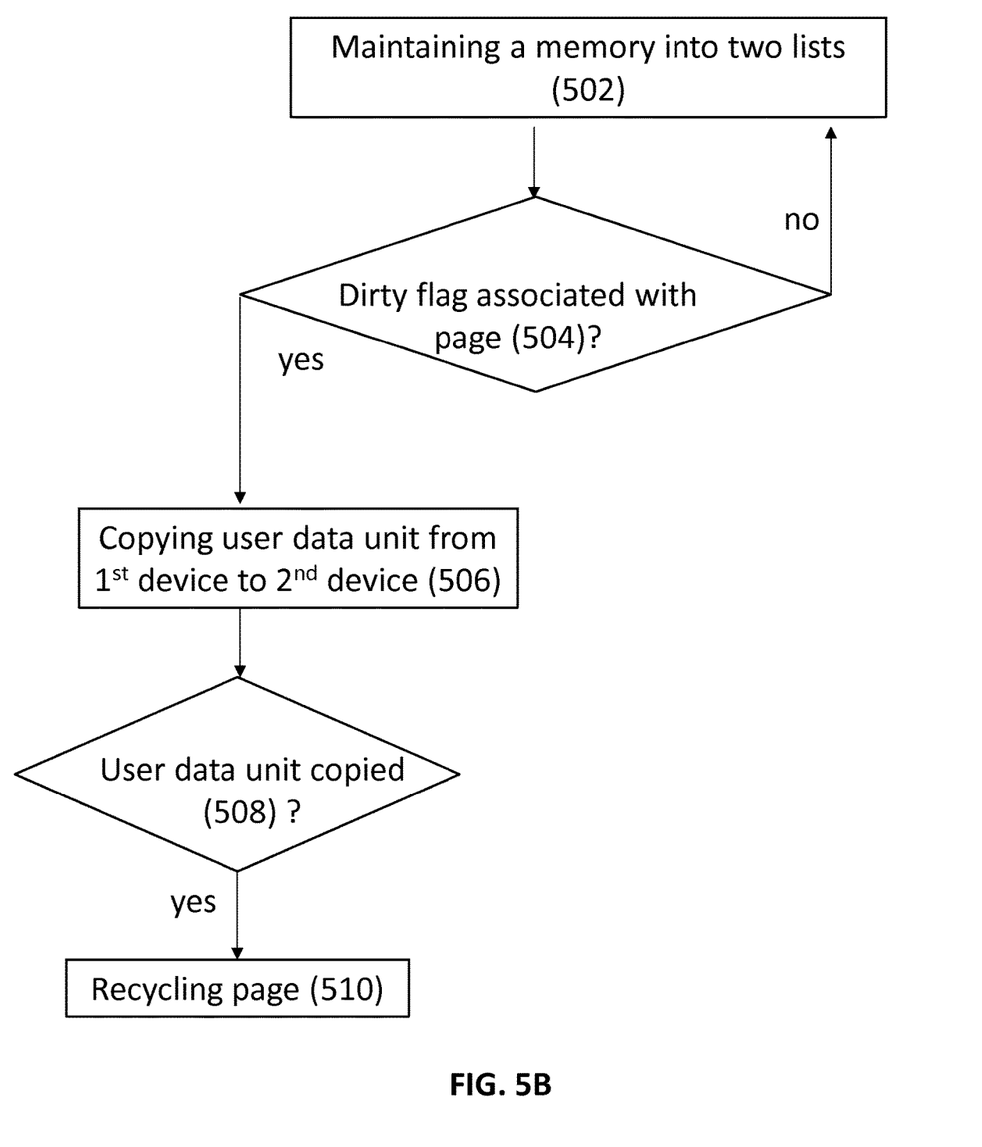

In another embodiment, which is schematically illustrated in FIGS. 5A and 5B, a memory (which may be part of a fast access device such as non-volatile memory 13) is maintained into a first list of pages (La) and a second list of pages (Lb). The first list (La) is to receive an unclassified page at the head of the first list, as indicated by arrow 51 and the second list (Lb) is to receive at the head of the second list a page moved from the tail of the first list, as indicated by arrow 52. Each of the lists La and Lb may be managed based on a repeated access pattern. For example, as indicated by arrows 53 and 54, once a page is requested again, or re-accessed, it is typically moved to the head of a list, in this embodiment to the head of list La. The page is then pushed through the lists as additional pages are added to the heads of the lists. By construction, as described above, the page (or pages) at the tail of the list is the least recently used and may be eventually moved out of the list (as demonstrated by arrow 55).

In one embodiment a page from the first list (La) may be associated with a transparent flag. Protection against direct access to the page may be provided (e.g., as described above) when the page is removed from the tail of the first list, prior to being moved to the head of La or Lb.

In one embodiment a non-volatile memory (e.g., non-volatile memory 13) in a first tier (e.g., tier 113) is maintained into two lists La and Lb as described above and a cleaning point 59 is provided at or after the tail of La.

At the cleaning point 59 a dirty flag associated with the page may be asserted and a step of copying the user data unit associated with this page, from the first storage type device to a second storage type device is initiated. While the user data unit is being copied it or the page associated with it, is being moved through Lb, as described above.

This embodiment enables early cleaning of pages while maintaining the data associated with the pages in the first storage type device so that this data may still be accessed with low latency. However, when the page has aged (typically near or at the tail of Lb) and there is a need to recycle a fast tier page resource (e.g., because there are no free pages) then the page can immediately be recycled and used again for new data without delay, since the data from the page has already been copied while the page was moving through Lb.

A memory may be maintained into a plurality lists La and Lb and pages may be assigned to the head of each La list by applying a modulo-based function on an address of the page, as described above.

In one embodiment, which is schematically illustrated in FIG. 5B, the method (which may include the steps described in FIG. 3A-3C) includes maintaining a memory into a first list of pages and a second list of pages (502), the first list to receive an unclassified page at the head of the first list (e.g., as demonstrated by arrow 51 in FIG. 5A) and the second list to receive at the head of the second list a page moved from the tail of the first list (e.g., as demonstrated by arrow 52 in FIG. 5A). The method may further include asserting, at or after the tail of the first list, a dirty flag associated with the page (504); and based on the asserting of the dirty flag, copying a user data unit associated with the page, from a first storage type device to a second storage type device (506).

In one embodiment the method includes determining that the user data unit was copied from the first storage type device to the second storage type device (508) (e.g., determining that the process of copying has been completed) and then recycling the page from the first storage type device (510), e.g., by nullifying the data on the page, thereby providing a clean data unit or page which can be used to store new data.

In one embodiment a pool of clean pages may be maintained at the tail of a list, e.g., at the tail of Lb. The method may include the step of moving a clean page to the tail of the second list. In other embodiments clean pages may be stored in a separate pool or list or at the tail of another list.

Figure 6:
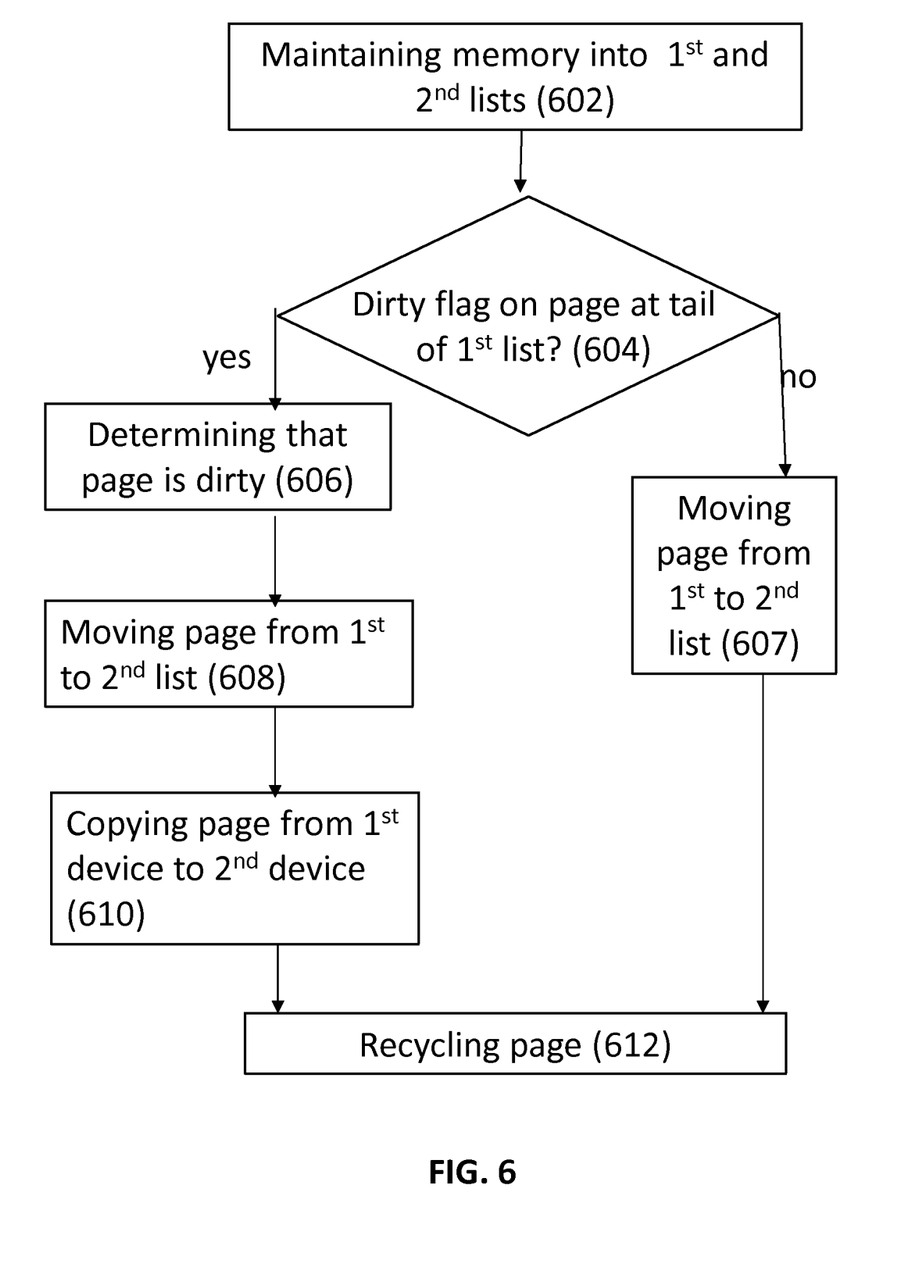
FIG. 6 schematically illustrates a method for recycling a user data unit in a file system, according to an embodiment of the invention.

In one embodiment of the invention there is provided a method for recycling a user data unit in a file system. The method, according to one embodiment which is schematically illustrated in FIG. 6, includes maintaining a memory of a first storage device into a first list of pages and a second list of pages (602). The pages may include a user data unit and/or meta data. At the tail of the first list, a dirty flag associated with a page may be asserted (604), thereby determining that the page is dirty (606). Whether the page has been determined to be dirty (606) or whether the page has not been determined to be dirty, the method further includes moving the page from the tail of the first list to the head of the second list (607 and 608). If the page has been determined to be dirty it is copied from a first storage device to a second storage device (610) while it is moving through the second list. The copying may be initiated before the page is moved into the second list. For example, the copying may be done when the page is determined to be dirty (606) and copying the page from the first storage device to the second storage device (610) may be done before moving the page from the tail of the first list to the head of the second list (608).

Moving through the second list provides time for the copying process to be completed so that when the page is at or near the tail of the second list it has probably been fully copied to the second storage device. Thus, pages may be recycled (612) (e.g., the page may be nullified, thereby providing a clean page which can be removed from the second list and can be used to store new data) immediately, thereby saving time.

Typically, it is determined whether the dirty page has been fully copied prior to recycling the page.

In one embodiment nullified page(s) may be stored at the tail of the second list.

In one embodiment a memory of a first storage device may be maintained into a plurality of first lists and second lists and pages are assigned a first list from the plurality of first lists by applying a modulo-based function on an address of the page, as described above.

The first storage device described in FIG. 6 is typically a lower latency storage device than the second storage device.

In one embodiment the memory described in FIG. 6 is a non-volatile memory device which is referenced by a byte addressable memory pointer.

Methods and systems according to embodiments of the invention enable writing several user changes to the same page in a faster access tier (which includes a non-volatile memory) before it is written to the slower access tier (which may include an SSD), thereby delaying writing to the slower access tier and reducing the wear-out involved in multiple copying of pages, providing efficient placement methods.

What is claimed is:

1. A method for data placement in a memory-based file system, the method comprising:
   copying a user data unit from a second storage type device to a first storage type device based on an access request to the file system, the first storage type device comprising a persistent memory and being a faster access device than the second storage type device;
   maintaining the persistent memory into a list of pages and managing the list based on a repeated data access pattern;
   referencing the user data unit in the first storage type device by a byte addressable memory pointer;
   using the byte addressable memory pointer to copy the user data unit from the first storage type device to the second storage type device based on data access pattern; and
   maintaining the persistent memory into a first list of pages and a second list of pages, the first list to receive an unclassified page at the head of the first list and the second list to receive, at the head of the second list, a page moved from the tail of the first list;
   wherein the access request to the file system comprises an mmap system call thereby providing a page having a transparent flag and providing protection against direct access to the page having the transparent flag prior to the page being received at the head of the second list.

2. The method of claim 1, further comprising: in response to a second access request, providing the user data unit from the first storage type device and not providing the user data unit from the second storage type device.

3. The method of claim 1, wherein the data access pattern is a repeated access pattern.

4. The method of claim 1, further comprising:
   maintaining the persistent memory into a plurality of lists each list to receive an unclassified page at the head of the list; and
   assigning the unclassified page unit to a list from the plurality of lists by applying a function on an address of the unclassified page.

5. The method of claim 4, wherein the function comprises a modulo-based function.

6. The method of claim 1, further comprising: moving the page from the second list to the head of the first list based on a repeated access pattern.

7. The method of claim 1, further comprising:
at the tail of the first list, asserting a dirty flag associated with a page; and
based on the assertion of the dirty flag, copying a user data unit associated with the page from the first storage type device to the second storage type device while the page is in the second list.

8. The method of claim 7, further comprising:
determining that the user data unit was fully copied to the second storage type device; and
nullifying the user data unit from the first storage type device, thereby providing a clean page.

9. The method of claim 8, further comprising: moving the clean page to the tail of the second list.

10. A non-transitory, machine readable medium having stored thereon instructions comprising machine executable code which when executed by a machine, causes the machine to:
copy a user data unit from a second storage type device to a first storage type device based on an access request to a memory-based file system, the first storage type device comprising a persistent memory and being a faster access device than the second storage type device;
maintain the persistent memory into a list of pages and managing the list based on a repeated data access pattern;
reference the user data unit in the first storage type device by a byte addressable memory pointer;
use the byte addressable memory pointer to copy the user data unit from the first storage type device to the second storage type device based on data access pattern; and
maintain the persistent memory into a first list of pages and a second list of pages, the first list to receive an unclassified page at the head of the first list and the second list to receive, at the head of the second list, a page moved from the tail of the first list;
wherein the access request to the file system comprises an mmap system call thereby providing a page having a transparent flag and providing protection against direct access to the page having the transparent flag prior to the page being received at the head of the second list.

11. The non-transitory, machine readable medium of claim 10, the machine executable code further causing the machine to:
in response to a second access request, provide the user data unit from the first storage type device and not provide the user data unit from the second storage type device.

12. The non-transitory, machine readable medium of claim 10, wherein the data access pattern is a repeated access pattern.

13. The non-transitory, machine readable medium of claim 10, the machine executable code further causing the machine to:
maintain the persistent memory into a plurality of lists each list to receive an unclassified page at the head of the list; and
assign the unclassified page unit to a list from the plurality of lists by applying a function on an address of the unclassified page.

14. The non-transitory, machine readable medium of claim 10, the machine executable code further causing the machine to:
move the page from the second list to the head of the first list based on a repeated access pattern.

15. The non-transitory, machine readable medium of claim 10, the machine executable code further causing the machine to:
at the tail of the first list, assert a dirty flag associated with a page; and
based on the assertion of the dirty flag, copy a user data unit associated with the page from the first storage type device to the second storage type device while the page is in the second list.

16. A system, comprising:
a memory containing machine readable medium comprising machine executable code having stored thereon instructions; and a processor coupled to the memory, the processor configured to execute the machine executable code to:
copy a user data unit from a second storage type device to a first storage type device based on an access request to a file system, the first storage type device comprising a persistent memory and being a faster access device than the second storage type device;
maintain the persistent memory into a list of pages and managing the list based on a repeated data access pattern;
reference the user data unit in the first storage type device by a byte addressable memory pointer;
use the byte addressable memory pointer to copy the user data unit from the first storage type device to the second storage type device based on data access pattern; and
maintain the persistent memory into a first list of pages and a second list of pages, the first list to receive an unclassified page at the head of the first list and the second list to receive, at the head of the second list, a page moved from the tail of the first list;
wherein the access request to the file system comprises an mmap system call thereby providing a page having a transparent flag and providing protection against direct access to the page having the transparent flag prior to the page being received at the head of the second list.

17. The system of claim 16, the machine executable code further caused to:
in response to a second access request, provide the user data unit from the first storage type device and not provide the user data unit from the second storage type device.

18. The system of claim 16, wherein the data access pattern is a repeated access pattern.

19. The system of claim 16, the machine executable code further caused to:
maintain the persistent memory into a plurality of lists each list to receive an unclassified page at the head of the list; and
assign the unclassified page unit to a list from the plurality of lists by applying a function on an address of the unclassified page.

20. The system of claim 16, the machine executable code further caused to:
move the page from the second list to the head of the first list based on a repeated access pattern.

* * * * *